Figure 1:
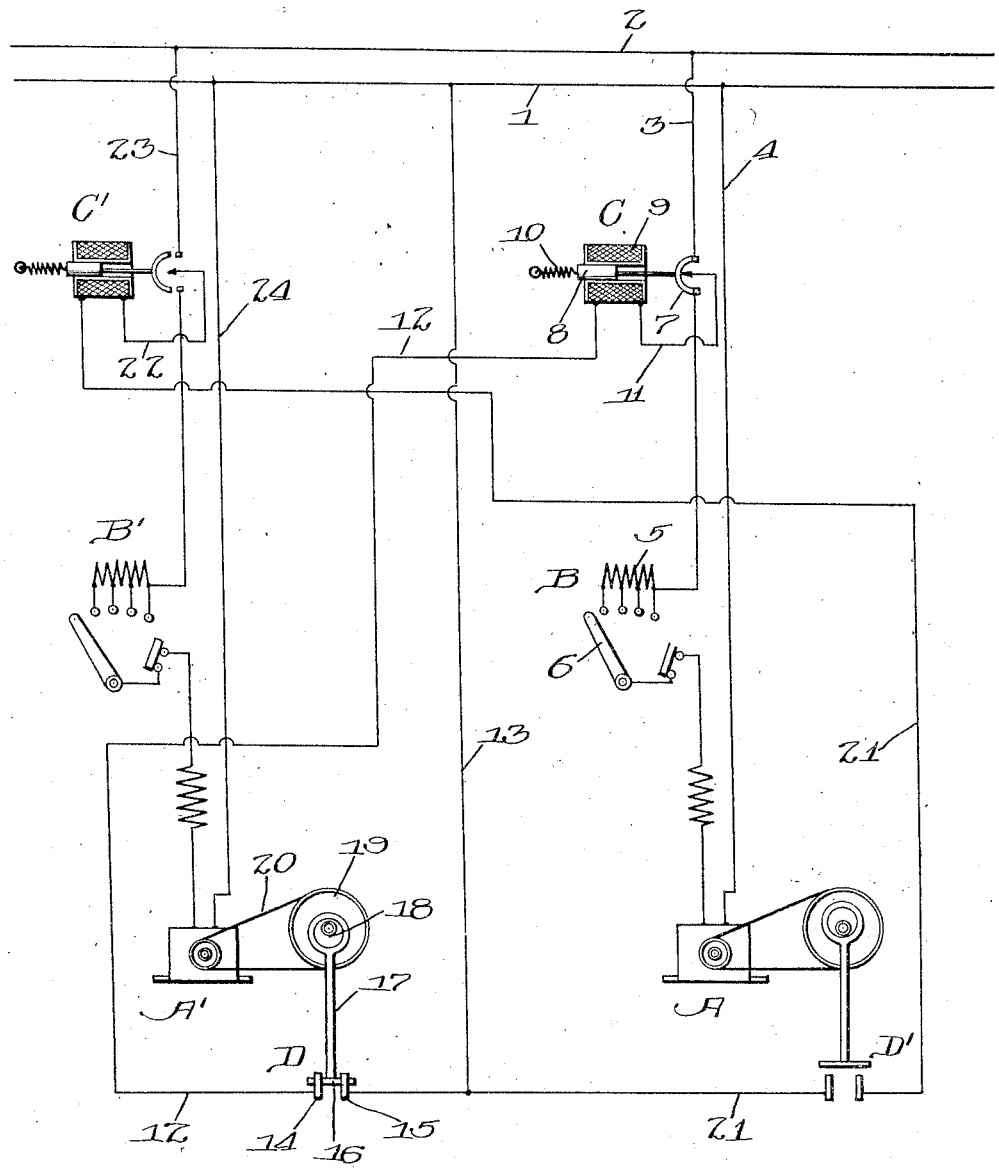

No. 894,199. PATENTED JULY 28, 1908.
R. M. GASTON.
SYSTEM OF CONTROL FOR ELECTRIC MOTORS.
APPLICATION FILED NOV. 29, 1907.

2 SHEETS—SHEET 1.

Witnesses:

Inventor:
Ralph M. Gaston
by O. R. Barnett
Atty.

No. 894,199. PATENTED JULY 28, 1908.
R. M. GASTON.
SYSTEM OF CONTROL FOR ELECTRIC MOTORS.
APPLICATION FILED NOV. 29, 1907.

2 SHEETS—SHEET 2.

Witnesses:

Inventor:
Ralph M. Gaston
by O. R. Barnett
Atty.

UNITED STATES PATENT OFFICE.

RALPH M. GASTON, OF MORGAN PARK, ILLINOIS.

SYSTEM OF CONTROL FOR ELECTRIC MOTORS.

No. 894,199.

Specification of Letters Patent.

Patented July 28, 1908.

Application filed November 29, 1907. Serial No. 404,283.

*To all whom it may concern:*

Be it known that I, RALPH M. GASTON, a citizen of the United States, residing at Morgan Park, in the county of Cook and State of Illinois, have invented certain new and useful Improvements in Systems of Control for Electric Motors, of which the following is a specification.

My invention relates to the control of electric motors and has for its object to provide means whereby the operation of such electric motor is conditioned by the position of an electric or other motor or by the position of some other device or of mechanism operated by such motor or device.

In carrying out my invention current is supplied to the electric motor, the operation of which is to be controlled through a circuit breaker or other appropriate means which, when set in operation, shall prevent the motor from receiving current, such circuit breaker or equivalent means being set in operation by an electro-magnetic device contained in an auxiliary circuit opened or closed, or the flow of current therethrough otherwise controlled by the other motor or device or by the mechanism operated thereby.

When both the controlling and the controlled apparatus are electric motors, each of said motors may be similarly controlled. This will be done by associating with the second motor a circuit breaker or equivalent device on an auxiliary circuit which is opened and closed by operation of the first motor. The operation of each motor will then be conditional upon the position of the other. In like manner the operation of any number of motors might be controlled one by another. An advantage of such a system of control arises from the use of auxiliary circuits, which avoids the extension of the main circuit of the motor to be controlled to the point necessary to make a connection with the mechanism upon the position of which the operation of such motor is conditioned.

A practical example of the use of my invention is to be found in its application to the driving means utilized on a lift bridge for the purpose of operating the lift mechanism and the locking mechanism. When two electric motors are used in this connection, it is desirable that they should be so interlocked that one cannot operate until the other has done its work; or that when one electric motor is used in conjunction with a steam, gasolene, or other motor, or hand operated device, the electric motor used should be controlled by the position of the other motor or device. These practical applications of my invention are taken merely for the purpose of illustration, the invention being adapted to installations of different character where similar conditions prevail.

I have shown two different arrangements illustrating embodiments of my invention as applied to the interlocking of two motors. In one of these the closing of the auxiliary circuit is the condition to the operation of the motor which it controls. In the other arrangement, when the auxiliary circuit is supplied with current the circuit breaker is made effective to break the circuit. In this latter arrangement by connecting the auxiliary circuit to one of the motor leads between the motor and the circuit breaker, the circuit breaker may be allowed to remain closed and will be automatically opened only if the circuit through the motor be closed at the wrong time.

The objects above-mentioned and such other objects as may appear in the following specification are illustrated by the arrangements shown in the accompanying drawings, in which—

Figure 2:
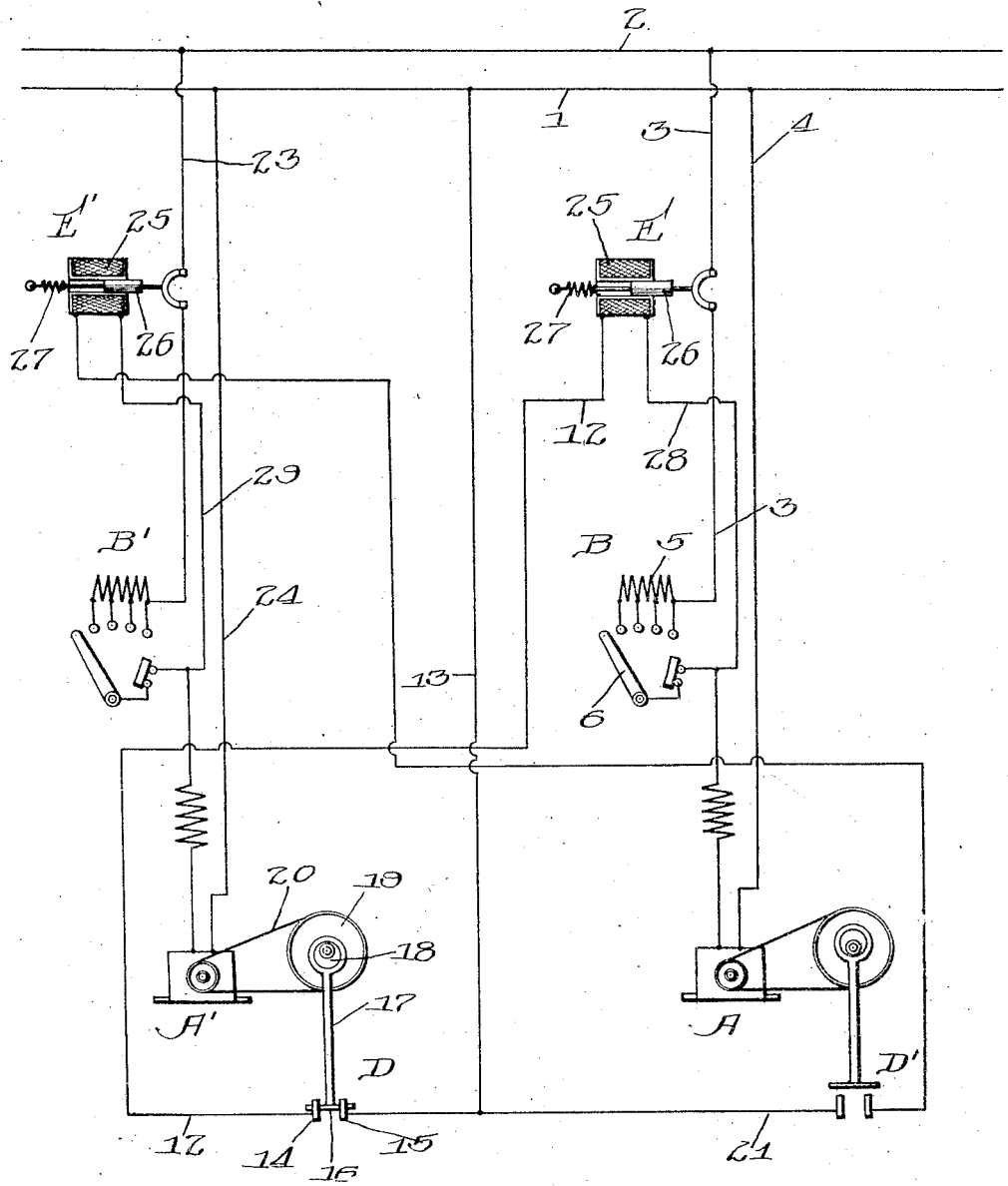

Figure 1 is a diagrammatic view of an arrangement of apparatus embodying my invention; and Fig. 2 is a similar view illustrating a modification.

Like characters of reference indicate corresponding parts in both drawings.

Referring first to Fig. 1, A represents a motor supplied from the mains 1, 2, by conductors 3, 4. Interposed in conductor 3 is a starting device B, of any ordinary type, here shown as consisting of a series of resistance coils 5 which are cut out of the circuit by the arm 6. C represents a circuit breaker. Any ordinary type of electro-magnetically operated circuit breaker may be used. As apparatus of this sort is well known and of itself forms no part of my invention, I have simplified this mechanism for the purpose of clear illustration, representing it as consisting of a switch arm 7 connected with the core 8 of a solenoid 9. The core of the solenoid is moved against the tension of a spring 10. Current may be supplied to solenoid 9 either from mains 1, 2 or from a separate source of supply. I have shown the solenoid as supplied from the same source as the motor through a conductor 11 which makes contact with switch arm 7 and conductors 12 and 13. In this auxiliary circuit is a switch D which is opened and closed by operation of the other motor A'. This switch or circuit breaker may be of any desired form and may be connected with motor A' through any desired form of mechanism adapted to open and close the switch for predetermined periods during the operation of its motor. I have represented the switch conventionally as consisting of the stationary contacts 14 and 15 and the movable contact 16 carried by the rod 17 reciprocated by an eccentric 18 on the shaft of a wheel 19 driven by a belt 20 from motor A'.

If contact 7 be moved in any manner, either automatically or by hand or otherwise, to its closing position and the circuit through motor A completed by means of starter B, the motor will receive current from the mains. Unless, however, the auxiliary circuit be closed by switch D, the circuit breaker will not operate to close the motor circuit at that point, the spring 10 holding movable contact 7 in its open position. With the auxiliary circuit closed, solenoid 9 will be energized so as to hold contact 7 in its closing position. In such case, the current through the auxiliary circuit will be as follows: From main 1 over conductors 13 and 12 and through switch D to solenoid 9; from solenoid 9 by conductor 11 to contact 7, and from contact 7 over conductor 3 to main 2.

It will be understood that the circuit breaker is represented somewhat conventionally and in simplified form. An ordinary type of trip coil circuit breaker might be used in an actual installation, in which case the electro-magnetic element of such well known apparatus would correspond to the magnet and core here shown.

If it is desired that the operation of motor A' should be conditioned by the position of motor A, the latter will be provided with a switch D' which makes and breaks the circuit through a conductor 21 leading from conductor 13 to the solenoid of a circuit breaker C', this solenoid having a conductor 22 which comes in contact with the movable contact of the circuit breaker C' when said contact is in its closing position. Circuit breaker C' makes and breaks the circuit through a conductor 23 leading from the main 2 to the motor A', starter B' being interposed in this conductor. A conductor 24 connects the other pole of the motor to the main 1. By this arrangement the operation of the motors A, A' is conditioned by the positions respectively of switches D, D', the latter being controlled in their operations by motors A', A, respectively. The circuit breakers may be set by hand or they may be of such a character as to operate automatically so that one of the motors will be automatically started as soon as, but not before, the other motor, or the apparatus controlled thereby, shall have reached its predetermined position.

In Fig. 2 is shown a modified form of apparatus, in which the motor circuits are opened by the circuit breaker, or will be automatically so opened if closed at another point, when the corresponding auxiliary circuits are supplied with current. This arrangement is the same as that of Fig. 1 except in the following respects: In place of circuit breakers C, C', I provide the circuit breakers E, E' which are somewhat conventionally illustrated in this figure as consisting of magnets 25 having cores 26 which operate to compress springs 27 when the magnets are energized. In place of conductors 11 and 22, I provide conductors 28 and 29 which lead from magnets E, E' respectively to conductors 3 and 23 respectively at points between the circuit breakers and the motors. When current is supplied to either one of the auxiliary circuits by the closing of its motor controlled switch, the circuit breakers will operate to break the corresponding motor circuit, but provided only that such circuits be closed at other places. It follows, therefore, that the circuit breakers may normally remain closed without being affected by operation of the motor controlled switches unless the corresponding motor circuits are closed at the wrong time at other points, for example, by the starters. In the latter event, the circuit breaker solenoids, which receive current only when their corresponding motor circuits are closed, will be energized to break these circuits.

I wish it to be understood that I do not desire to limit myself to the particular devices, constructions and arrangements here shown, as obvious modifications will occur to those skilled in the art which will be clearly within the scope of my invention. For example, it might not be necessary to actually break the circuits. My invention contemplates the substitution for the circuit breakers of any device which would be effective to prevent the flow of current through the circuits, whether by breaking the circuits or not.

I have chosen two typical arrangements, but these arrangements might be modified to a very considerable extent. For example, the motors and also the circuit breaker solenoids might be supplied with current from separate sources. For purposes of clear illustration I have endeavored to embody my invention in as simple forms of apparatus as possible.

I claim:

1. In combination, an electric motor, a main circuit for the same, an electrically operated controller to control the supply of current to the main circuit, said controller being on an auxiliary circuit, a second motor, and means operated thereby which condition the supply of current to the auxiliary circuit.

2. In combination, a pair of electric motors, main circuits for said motors, electrically operated controllers to control the supply of current to said main circuits respectively, and means for controlling the supply of current to each auxiliary circuit conditioned upon the position of the motor other than the one controlled by said auxiliary circuit and the controller contained therein.

3. In combination, a motor, an electromagnetic circuit breaker on an auxiliary circuit, a second motor, and means made effective by and at certain periods in the operation of said second motor to open and close the auxiliary circuit and thereby set the circuit breaker in operation.

4. In combination, a motor, an electromagnetic circuit breaker for the same, a starting device in circuit with the motor and circuit breaker, a second motor, and a switch in the auxiliary circuit opened and closed by and at certain periods in the operation of said second motor, whereby when the starter is closed the circuit breaker will be made effective to open the circuit of the first-named motor.

5. In combination, a pair of motors, electro-magnetic circuit breakers for each of said motors, auxiliary circuits for said circuit breakers, switches in said auxiliary circuits, and means made effective by and at certain periods in the operation of each of the motors whereby the circuit breaker for each motor is made operative to break its motor circuit conditional upon the position of the switch operated by the other motor.

6. In combination, a motor, an electromagnetic circuit breaker, an auxiliary circuit for the circuit breaker, a switch in said auxiliary circuit, a second motor, means made effective by and at certain periods in the operation of the second motor for opening and closing the auxiliary circuit, said circuit breaker being so connected with the motor that it may remain inoperative regardless of the movements of said switch and will be made operative by current conditions in the motor circuit.

7. In combination, a motor, a circuit breaker having electro-magnetic means adapted to be energized to close the circuit, an auxiliary circuit for the circuit breaker, said auxiliary circuit being connected to the motor circuit between the circuit breaker and the motor, a switch in said auxiliary circuit, a second motor, and means made effective by and at certain periods in the operation of said second motor for opening and closing said switch whereby the circuit breaker may be allowed to remain closed while the motor circuit is open and will become operative only when the motor circuit and the auxiliary circuit switch are closed.

8. In combination, an electric motor, an electro-magnetic device for permitting or preventing the supply of current to the motor, said device being on an auxiliary circuit, a driven device, and means made effective at certain positions of said driven device to cause current to be supplied to or shut off from said auxiliary circuit, whereby the operation of said motor depends upon the operation of the driven device.

9. In combination, an electric motor, a main circuit therefor, a controller to control the supply of current to said motor, said controller located in an auxiliary circuit, a second motor, and means operated thereby which condition the supply of current to said auxiliary circuit, said controller for said main circuit conditioned also by the presence of current in the main circuit.

10. In combination, an electric motor, a main circuit therefor, a circuit breaker to interrupt said main circuit, said circuit breaker being supplied from an auxiliary circuit, the second motor and means operated thereby which condition the supply of current to the auxiliary circuit, said circuit breaker normally in its closed position and its opening conditioned by the presence of current in the main circuit.

RALPH M. GASTON.

Witnesses:
 PERCIVAL H. TRUMAN,
 H. L. PECK.